US010281353B2

(12) United States Patent
Brusius

(10) Patent No.: US 10,281,353 B2
(45) Date of Patent: May 7, 2019

(54) PNEUMATIC AIR DATA PROBE WITH ELLIPTICAL CROSS SECTION

(71) Applicant: Rosemount Aerospace Inc., Burnsville, MN (US)

(72) Inventor: Nathan Brusius, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 197 days.

(21) Appl. No.: 15/373,037

(22) Filed: Dec. 8, 2016

(65) Prior Publication Data

US 2017/0167937 A1    Jun. 15, 2017

Related U.S. Application Data

(60) Provisional application No. 62/265,500, filed on Dec. 10, 2015.

(51) Int. Cl.
| | | |
|---|---|---|
| *G01L 7/18* | (2006.01) | |
| *G01L 19/10* | (2006.01) | |
| *G01P 5/165* | (2006.01) | |
| *G01P 13/02* | (2006.01) | |

(52) U.S. Cl.
CPC .............. *G01L 19/10* (2013.01); *G01P 5/165* (2013.01); *G01P 13/025* (2013.01)

(58) Field of Classification Search
CPC .......... G01L 18/10; G01L 13/02; G01P 5/165; G01P 13/025; G01P 13/00; G01F 1/46
See application file for complete search history.

(56) References Cited

U.S. PATENT DOCUMENTS

| | | | |
|---|---|---|---|
| 2,204,367 A | 6/1940 | Kollsman | |
| 4,718,273 A | 1/1988 | McCormack | |
| 5,233,865 A * | 8/1993 | Rossow | G01P 5/165 |
| | | | 73/147 |
| 6,651,515 B2 | 11/2003 | Bernard | |
| 8,857,255 B2 | 10/2014 | Anderson et al. | |
| 2005/0011285 A1 | 1/2005 | Giterman | |
| 2014/0169401 A1 | 6/2014 | Schwie et al. | |

FOREIGN PATENT DOCUMENTS

| | | |
|---|---|---|
| CA | 417143 A | 12/1943 |
| EP | 2947465 A1 | 11/2015 |

OTHER PUBLICATIONS

Extended European Search Report for European Patent Application No. 16201518.4, dated Feb. 15, 2017, 9 pages.

* cited by examiner

*Primary Examiner* — Lisa M Caputo
*Assistant Examiner* — Nigel H Plumb
(74) *Attorney, Agent, or Firm* — Kinney & Lange, P.A.

(57) ABSTRACT

An air data probe includes a probe head and an air data sensing port. The probe head defines a longitudinal axis extending from a forward tip of the probe head to an aft end of the probe head. The probe head has an elliptical cross section orthogonal to the longitudinal axis. The air data sensing port is disposed in the probe head aft of the forward tip. A length of a major axis of the elliptical cross section and a length of a minor axis of the elliptical cross section can be configured to cause boundary layer separation of airflow across the probe head at a flow separation region that is aft of the air data sensing port.

18 Claims, 3 Drawing Sheets

PNEUMATIC AIR DATA PROBE WITH ELLIPTICAL CROSS SECTION

CROSS-REFERENCE TO RELATED APPLICATION(S)

This application claims the benefit of U.S. Provisional Application No. 62/265,500 filed Dec. 10, 2015 for "AIR DATA PROBE WITH ELLIPTICAL CROSS SECTION" by Nathan Brusius, the contents of which are hereby incorporated by reference in their entirety.

BACKGROUND

The present disclosure relates generally to air data probes, and more particularly to air data probes for use in aerospace applications.

Air data probe devices can be utilized in, e.g., aerospace applications for measuring environmental parameters usable to determine air data outputs. For instance, air data probes can measure pitot pressure, static pressure, or other parameters of airflow across the air data probe that are usable for determining air data outputs, such as pressure altitude, altitude rate (e.g., vertical speed), airspeed, Mach number, angle of attack, angle of sideslip, or other air data outputs. Such air data probes often include one or more air data sensing ports, such as static pressure ports located on the side of the probe integral to the surface of the probe that are pneumatically connected to pressure sensors (e.g., pressure transducers) that sense the atmospheric pressure outside of the aircraft.

Air data probes, via the static pressure ports and corresponding pressure sensors, can provide consistent and accurate pressure measurements that are usable to accurately determine air data outputs over a broad range of aircraft flight envelopes. However, during certain flight conditions, such as at high angles of attack (both positive and negative) and low Reynolds numbers, it is possible for an air data probe to experience inconsistent pressures at the static ports that can result in less accurate air data output determinations.

SUMMARY

In one example, an air data probe includes a probe head and an air data sensing port. The probe head defines a longitudinal axis extending from a forward tip of the probe head to an aft end of the probe head. The probe head has an elliptical cross section orthogonal to the longitudinal axis. The air data sensing port is disposed in the probe head aft of the forward tip.

In another example, a probe includes a probe head and a port. The probe head defines a longitudinal axis extending from a forward tip of the probe head to an aft end of the probe head. The probe head has an elliptical cross section orthogonal to the longitudinal axis. The port is disposed in the probe head aft of the forward tip. A length of a major axis of the elliptical cross section and a length of a minor axis of the elliptical cross section are configured to cause boundary layer separation of airflow across the probe head at a flow separation region that is aft of the port.

DETAILED DESCRIPTION

As described herein, an air data probe can include a probe head having an elliptical cross section. That is, rather than a conventional circular cross section, a probe head according to techniques of this disclosure can include an elliptical cross section oriented to cause a boundary layer of airflow over the probe head to attach for a greater proportion of a circumference of the probe head than, e.g., a probe head having a circular cross section. Accordingly, an air data probe implementing techniques described herein can enable separation of the boundary layer of airflow to occur at a separation region that is remote from (e.g., aft of) the location of an air data sensing port (e.g., a static pressure port) for an entire defined flight envelope of an aircraft, such as a flight envelope including relatively high angles of attack that are greater than 10 degrees (both positive and negative) and relatively low Reynolds numbers on the order of $10^6$. As such, an air data probe as describe herein can help to ensure that an air data sensing port disposed on the probe head experiences attached boundary layer flow for such flight conditions, thereby increasing consistency and accuracy of pressure measurements across the defined flight envelope.

Figure 1:
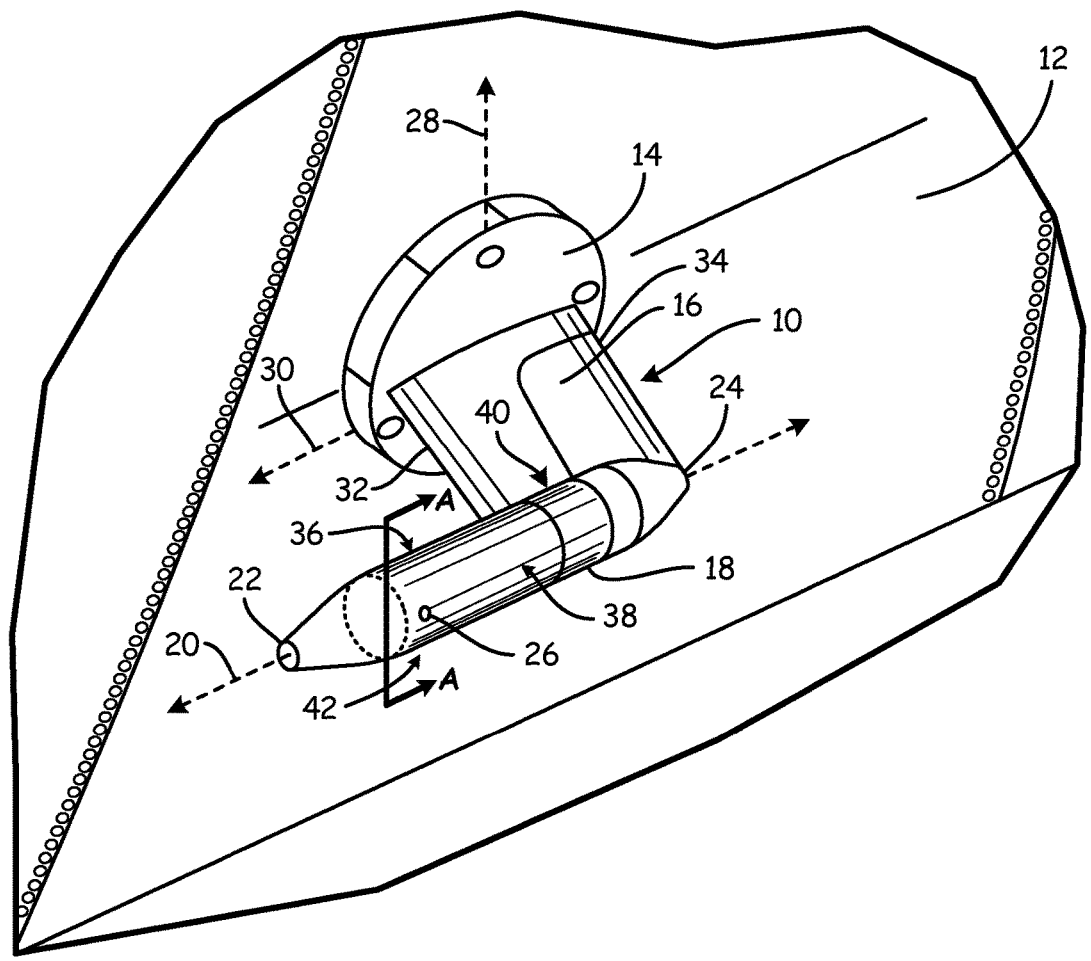
FIG. 1 is a perspective view of an air data probe attached to an aircraft, the air data probe having an elliptical cross section.

FIG. 1 is a perspective view of air data probe 10 having an elliptical cross section and showing air data probe 10 attached to aircraft 12. As illustrated in FIG. 1, air data probe 10 includes mounting plate 14, strut 16, and probe head 18. Probe head 18 defines longitudinal axis 20 that extends through probe head 18 from forward tip 22 to aft end 24 of probe head 18. As further illustrated, air data probe 18 includes air data sensing port 26 disposed in probe head 18 aft of forward tip 22.

Mounting plate 14 is configured to mount air data probe 10 to an exterior of aircraft 12 via one or more screws, bolts, rivets, or other attachment devices. As illustrated, mounting plate 14 defines a mounting plane that extends along perpendicular axes 28 and 30. Strut 16 extends between mounting plate 14 and probe head 18 to support probe head 18 in a stream of airflow passing over the exterior of aircraft 12. Strut 16, as in the example of FIG. 1, extends in a direction that is generally orthogonal (e.g., within positive or negative five degrees of orthogonal) to the mounting plane defined by axes 28 and 30 of mounting plate 14. Strut 16 includes forward end 32 proximate forward tip 20 of probe head 18 and aft end 34 proximate aft end 24 of probe head 18. As illustrated, aft end 34 of strut 16 can be adjacent to aft end 24 of probe head 18.

Strut 16 both supports probe head 18 in the stream of airflow passing over the exterior of aircraft 12 and houses pneumatic and/or electrical connections between air data sensing port 26 (or other ports defined in probe head 18) and pressure sensors and/or controller devices of an air data system housed within an interior of aircraft 12. That is, air data sensing port 26, as well as other air data sensing ports that can be included in probe head 18 (not illustrated), can be pneumatically connected to one or more pressure sensors (e.g., pressure transducers) for sensing pressures, such as static air pressure, total air pressure, or other pressures of air moving across probe head 18.

Probe head 18, as illustrated in FIG. 1, defines longitudinal axis 20 that extends between forward tip 20 and aft end 24 of probe head 18. Longitudinal axis 20 extends generally in a direction of forward flight of aircraft 12. That is, forward tip 20 is oriented toward a nose of aircraft 12 and aft end 24 is oriented toward a tail of aircraft 12, such that a direction from aft end 24 to forward tip 22 along longitudinal axis 20 corresponds generally (e.g., within five degrees) with a forward direction of flight of aircraft 12.

Probe head 18, as illustrated in FIG. 1 and further described below, has an elliptical cross section orthogonal to longitudinal axis 20. As such, probe head 18 can be described as generally having an elliptically cylindrical shape, the length of the elliptical cylinder extending along longitudinal axis 20. The elliptically cylindrical shape, defined in part by the elliptical cross section of probe head 18, defines proximate side 36, distal side 38, upper side 40, and lower side 42 of probe head 18. Proximate side 36 is proximate (e.g., facing) mounting plate 14 (and hence aircraft 12 when mounted). Distal side 38 is opposite proximate side 38, such that distal side 38 faces away from mounting plate 14 (and hence away from aircraft 12 when mounted). Lower side 42 is configured to be generally ground-facing (e.g., facing an underside of aircraft 12) when air data probe 10 is mounted on aircraft 12. Upper side 40 is opposite lower side 42, and is configured to be generally upward facing (e.g., facing a top of aircraft 12) when air data probe 10 is mounted on aircraft 12.

Air data probe 10 further includes air data sensing port 26 integral with an exterior of probe head 18 and disposed aft of forward tip 22. As illustrated, air data sensing port 26 is disposed in distal side 38 of probe head 18. Though not illustrated in FIG. 1, air data probe 10 can include additional air data sensing ports, such as an air data sensing port disposed in proximate side 36 opposite air data sensing port 26. In addition, in some examples, air data probe 10 can include an air data sensing port in forward tip 22 configured for sensing total pressure (e.g., stagnation pressure) of airflow across probe head 18.

In operation, as air flows over probe head 18 (e.g., during flight), a portion of the airflow is directed into air data sensing port 26 (e.g., a static pressure port configured for use in measuring static pressure of airflow over probe head 18), which is pneumatically connected to one or more pressure transducers or other pressure sensors. Outputs of the pressure sensors are electrically connected to a controller or other computing device (e.g., included within an air data system) including one or more processors and computer-readable memory encoded with instructions that, when executed by the one or more processors, cause the controller device to determine one or more air data outputs based on the measured pressure(s) received from the pressure sensors via air data sensing port 26. Examples of such air data outputs include, but are not limited to, pressure altitude, altitude rate (e.g., vertical speed), airspeed, Mach number, angle of attack, and angle of sideslip.

Airflow across probe head 18 forms an attached boundary layer adjacent to the exterior surface of probe head 18. As the airflow moves across the surface of probe head 18, an adverse pressure gradient created by the flow causes flow separation in a region of probe head 18 in which the boundary layer separates from the surface of probe head 18, thereby producing a wake of eddies and vortices at the flow separation region. Airflow diverted to air data sensing port 26 from the attached boundary layer produces predictable and consistent pressure measurements. In contrast, airflow diverted to air data sensing port 26 from the flow separation region can result in inconsistent pressure measurements.

As is further described below, the elliptical cross section of probe head 18 can enable attached boundary layer airflow over probe head 18 in the region of air data sensing port 26 for an entirety of a defined operational flight envelope of aircraft 12. For instance, a length of each of major and minor axes of the elliptical cross section can be selected (e.g., during a design phase of air data probe 10) such that boundary layer separation of airflow across probe head 18 occurs at a flow separation region that is remote from (e.g., aft of) air data sensing port 26 across a defined operational flight envelope of aircraft 12. The defined operational flight envelope can include, e.g., angles of attack (i.e., an angle between oncoming airflow or relative wind and a reference line of a wing of aircraft 12) between positive and negative 20 degrees and Reynolds numbers (i.e., a dimensionless quantity defined as the ratio of inertial forces to viscous forces of a fluid) on the order of $10^6$. As such, air data probe 10 implementing techniques of this disclosure can help to ensure that air data sensing port 26 experiences attached boundary layer airflow (rather than separated airflow), thereby helping to increase the consistency and accuracy of pressure measurements across the defined flight envelope of aircraft 12.

Figure 2:
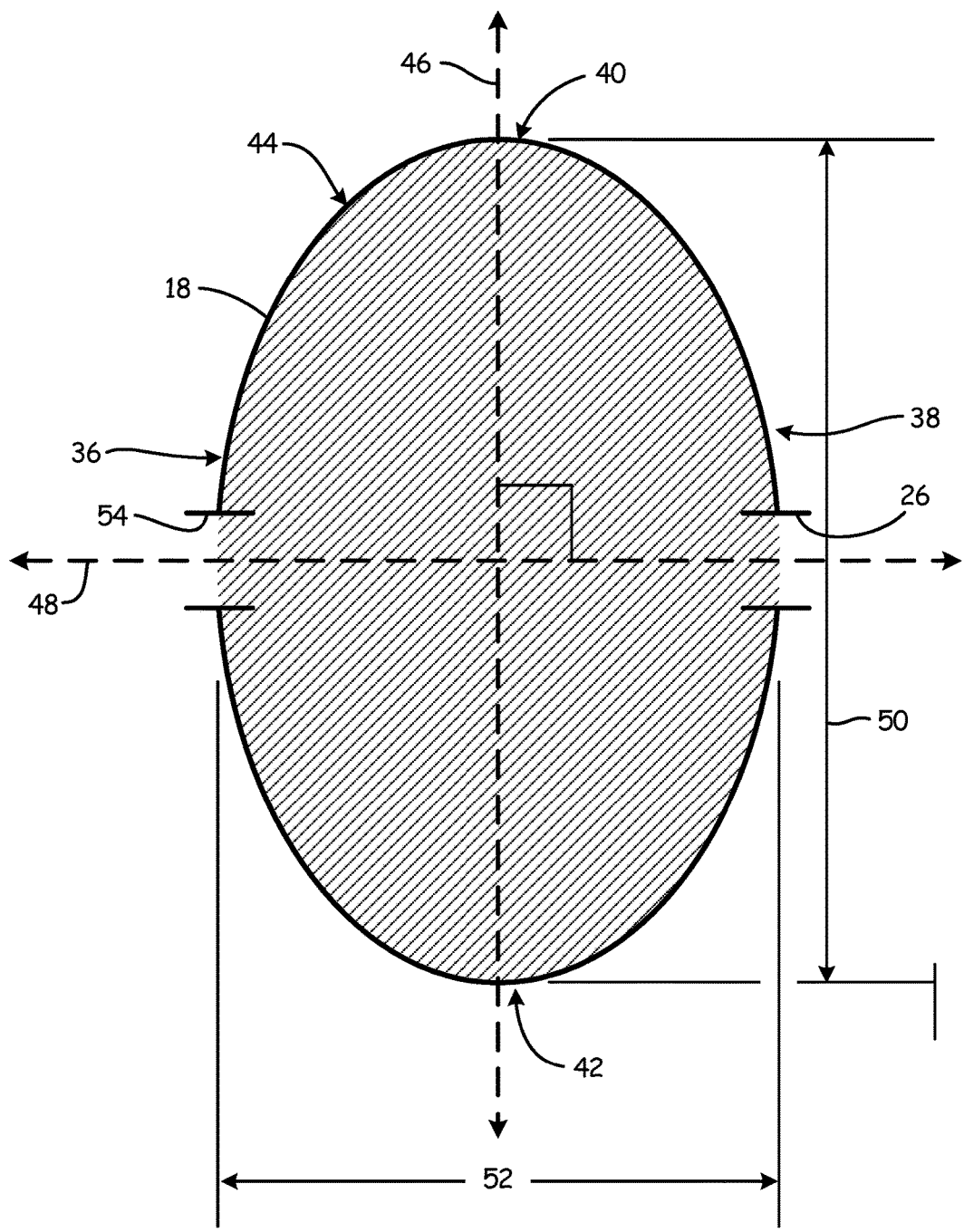
FIG. 2 is a partial cross-sectional view of the air data probe of FIG. 1 taken along line A-A.

FIG. 2 is a partial cross-sectional view of air data probe 10 of FIG. 1 taken along line A-A. FIG. 2 represents a cross-sectional view of the exterior of probe head 18 with internal components not shown. Air data sensing port 26 (illustrated as a break in the cross-sectional view) is disposed on distal side 38 of probe head 18. Air data sensing port 54 (not illustrated in FIG. 1 and similarly illustrated as a break in the cross-sectional view) is disposed on proximate side 36 opposite air data sensing port 26. In the example of FIG. 2, each of air data sensing port 26 and air data sensing port 54 are disposed along minor axis 48, though in other examples any one or more of air data sensing port 26 and air data sensing port 54 can be disposed at other locations along the exterior of probe head 18, such as upper side 40, lower side 42, or one of air data sensing port 26 and air data sensing port 54 disposed along upper side 40 and the other disposed along lower side 42. In some examples, air data sensing port 26 and air data sensing port 54 can each be static pressure ports pneumatically connected to one or more pressure sensors and configured for use in measuring static pressure of airflow across probe head 18. In certain examples, air data sensing port 26 and air data sensing port 54 can be pneumatically averaged and connected to a single pressure sensor. In other examples, air data sensing port 26 and air data sensing port 54 can be pneumatically isolated and each connected to separate pressure sensors.

As illustrated in FIG. 2, probe head 18 has elliptical cross section 44 defined by major axis 46 and minor axis 48. Major axis 46 extends between upper side 40 and lower side 42 of probe head 18. Minor axis 48 extends between proximate side 36 and distal side 38 of probe head 18. As illustrated, major axis 46 and minor axis 48 are perpendicular and intersect at a center of elliptical cross section 44, such that major axis 46 bisects elliptical cross section 44 and separates proximate side 36 from distal side 38. Similarly, minor axis 48 bisects elliptical cross section 44 and separates upper side 40 from lower side 42. In the example of FIG. 2, longitudinal axis 20 extends orthogonally to elliptical cross section 44 (i.e., perpendicular to both major axis 46 and minor axis 48) through the intersection of major axis 46 and minor axis 48 at the center of elliptical cross section 44 (i.e., into and out of the page).

Major axis 46 has a length 50 that is greater than a length 52 of minor axis 48. Major axis 46 can have any length that is greater than a length of minor axis 48, though in some examples, a ratio of length 50 of major axis 46 to length 52 of minor axis 48 is greater than or equal to 1.1 and less than or equal to 1.7. Length 50 of major axis 46 and length 52 of minor axis 58 can be selected (e.g., during a design phase of air data probe 10) such that boundary layer separation of airflow across probe head 18 occurs at a flow separation region that is remote from (e.g., aft of) air data sensing port 26 (and air data sensing port 54 when included). Length 50 of major axis 46 and length 52 of minor axis 58 can be selected such that boundary layer separation occurs at the flow separation region that is remote from air data sensing port 26 for an entirety of an operational flight envelope of aircraft 12, such as a flight envelope including angles of attack between negative twenty and positive twenty degrees and Reynolds numbers between zero and $2 \times 10^7$ (i.e., 20,000,000). For instance, computational fluid dynamics (CFD) software can be utilized in some examples to simulate the velocity of airflow around probe head 18 at various flight conditions representing the operational flight envelope of aircraft 12 and to identify a flow separation region of probe head 18 at which boundary layer separation of the airflow occurs. Such CFD analysis can be utilized to select length 50 of major axis 46 and length 52 of minor axis 48 such that the flow separation region is remote from (e.g., aft of) the location of air data sensing port 26 (and air data sensing port 54 when included) for the entirety of the operational flight envelope. Accordingly, dimensions of elliptical cross section 44 can be selected such that air data sensing ports (e.g., air data sensing ports 26 and/or 54) experience attached flow throughout the operational flight envelope of aircraft 12, thereby helping to increase the consistency and accuracy of pressure measurements sensed via the air data sensing ports.

Figure 3A:
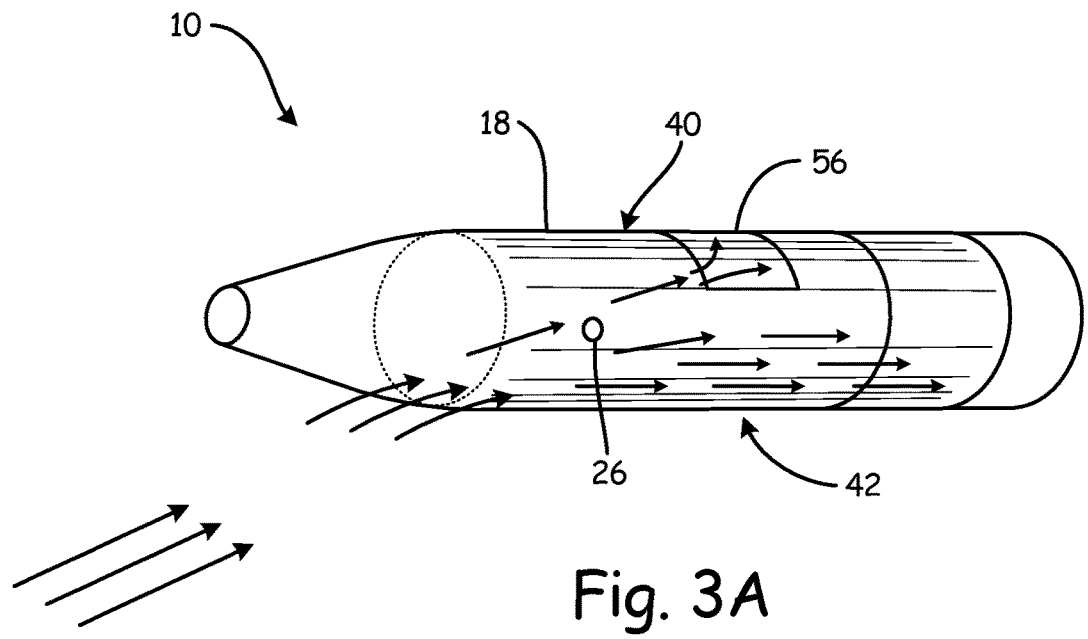
FIG. 3A is a schematic diagram illustrating an example flow separation region for positive angles of attack experienced by the air data probe.

FIG. 3A is a schematic diagram illustrating an example flow separation region 56 for positive angles of attack experienced by air data probe 10. FIG. 3A schematically illustrates airflow across probe head 18 corresponding to a positive angle of attack of aircraft 12. As illustrated, airflow having a directional component from lower side 42 to upper side 40 (corresponding to positive angles of attack of aircraft 12) moves over the surface of probe head 18 via an attached boundary layer that separates from the surface of probe head 18 at flow separation region 56. Flow separation region 56, in this example, is aft of air data sensing port 26, such that airflow is diverted to air data sensing port 26 from the attached boundary layer of airflow rather than from the region of separated flow. It should be understood, however, that the example of FIG. 3A is schematic in nature, in that the arrows illustrating airflow over probe head 18 as well as the location of flow separation region 56 is representative of a theoretical positive angle of attack, but that direction and velocity of airflow and the location of flow separation region 56 can change as a function of the angle of attack. In general, dimensions of elliptical cross section 44 of probe head 18 (illustrated in FIG. 2) can be selected such that flow separation region 56 is located aft and above (i.e., on upper side 40) air data sensing port 26 for positive angles of attack resulting from forward flight.

Figure 3B:
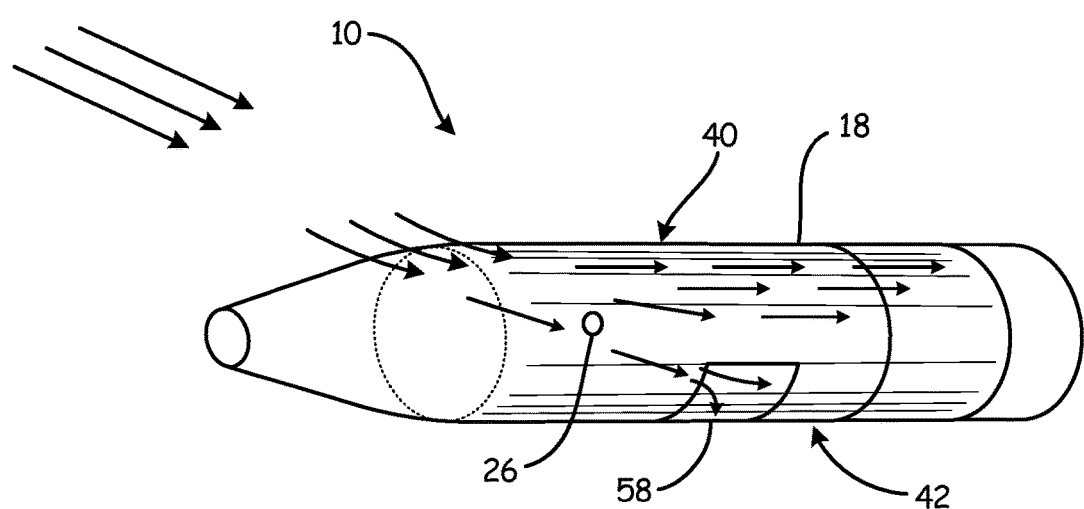
FIG. 3B is a schematic diagram illustrating an example flow separation region for negative angles of attack experienced by the air data probe.

FIG. 3B is a schematic diagram illustrating an example flow separation region 58 for negative angles of attack experienced by air data probe 10. The example of FIG. 3B corresponds generally to the example described above with respect to FIG. 3A, except that FIG. 3B schematically illustrates airflow across probe head 18 corresponding to a negative angle of attack of aircraft 12. As illustrated, airflow having a directional component from upper side 40 to lower side 42 (corresponding to negative angles of attack of aircraft 12) moves over the surface of probe head 18 via an attached boundary layer that separates from the surface of probe head 18 at flow separation region 58. Flow separation region 58, in this example, is aft of air data sensing port 26, such that airflow is diverted to air data sensing port 26 from the attached boundary layer of airflow rather than from the region of separated flow. As in the example of FIG. 3A, it should be understood that the example of FIG. 3B is schematic in nature, meaning that the arrows illustrating airflow over probe head 18 as well as the location of flow separation region 58 is representative of a theoretical negative angle of attack, but that direction and velocity of airflow and the location of flow separation region 58 can change as a function of the angle of attack. In general, dimensions of elliptical cross section 44 of probe head 18 (illustrated in FIG. 2) can be selected such that flow separation region 58 is located aft and below (i.e., on lower side 42) air data sensing port 26 for negative angles of attack resulting from forward flight.

As described herein, air data probe 10 can include probe head 18 having elliptical cross section 44. Dimensions of elliptical cross section 44 (e.g., length 50 of major axis 46 and length 52 of minor axis 48) can be selected such that boundary layer separation of airflow across probe head 18 occurs at flow separation regions (e.g., regions 56 and/or 58) that are aft of air data sensing port 26 for an operational envelope of aircraft 12 including relatively high angles of attack (e.g., greater than positive and/or negative 10 degrees) and relatively low Reynolds numbers on the order of $10^6$. Accordingly, techniques of this disclosure can help to ensure that air data sensing port 26 experiences attached airflow (as opposed to separated airflow) across the operational envelope, thereby increasing the consistency and accuracy of pressure measurements and corresponding air data output determinations.

The following are non-exclusive descriptions of possible embodiments of the present invention.

An air data probe includes a probe head and an air data sensing port. The probe head defines a longitudinal axis extending from a forward tip of the probe head to an aft end of the probe head. The probe head has an elliptical cross section orthogonal to the longitudinal axis. The air data sensing port is disposed in the probe head aft of the forward tip.

The air data probe of the preceding paragraph can optionally include, additionally and/or alternatively, any one or more of the following features, configurations, and/or additional components.

The air data probe can further include a base plate configured to mount the air data probe to an exterior of an aircraft. The probe head can include a proximate side and a distal side with respect to the base plate. The distal side can be opposite the proximate side. The elliptical cross section can include a major axis and a minor axis perpendicular to the major axis. The minor axis can extend between the proximate side and the distal side.

A ratio of a length of the major axis to a length of the minor axis can be greater than or equal to 1.1 and less than or equal to 1.7.

The longitudinal axis of the probe head can be parallel to a plane defined by the base plate.

The air data sensing port can be disposed on the distal side of the probe head.

The air data sensing port can be a first air data sensing port. The air data probe can further include a second air data sensing port disposed on the proximate side of the probe head.

The air data sensing port can be disposed along the minor axis of the elliptical cross section.

The air data probe can further include a strut extending between the base plate and the probe head. An aft end of the strut can be adjacent to the aft end of the probe head.

The air data sensing port can be configured for use in measuring static air pressure.

A probe can include a probe head and a port. The probe head can define a longitudinal axis extending from a forward tip of the probe head to an aft end of the probe head. The probe head can have an elliptical cross section orthogonal to the longitudinal axis. The port can be disposed in the probe head aft of the forward tip. A length of a major axis of the elliptical cross section and a length of a minor axis of the elliptical cross section can be configured to cause boundary layer separation of airflow across the probe head at a flow separation region that is aft of the port.

The probe of the preceding paragraph can optionally include, additionally and/or alternatively, any one or more of the following features, configurations and/or additional components:

A ratio of the length of the major axis to the length of the minor axis can be greater than or equal to 1.1 and less than or equal to 1.7.

For positive angles of attack of the airflow across the probe head, the flow separation region can be aft and above the port.

For negative angles of attack of the airflow across the probe head, the flow separation region can be aft and below the port.

The length of the major axis and the length of the minor axis of the elliptical cross section can be selected to cause the boundary layer separation of the airflow across the probe head at the flow separation region that is aft of the port for all flight conditions included within a defined flight envelope of an aircraft.

The length of the major axis and the length of the minor axis of the elliptical cross section can be configured to cause the boundary layer separation of the airflow across the probe head at the flow separation region for angles of attack ranging between negative twenty degrees and positive twenty degrees.

The length of the major axis and the length of the minor axis of the elliptical cross section can be configured to cause the boundary layer separation of the airflow across the probe head at the flow separation region for Reynolds numbers on the order of $10^6$.

The probe can further include a base plate configured to mount the probe to an exterior of an aircraft. The probe head can include a proximate side and a distal side with respect to the base plate. The distal side can be opposite the proximate side. The minor axis of the elliptical cross section can extend between the proximate side and the distal side.

The longitudinal axis of the probe head can be parallel to a plane defined by the base plate.

The port can be disposed along the minor axis of the elliptical cross section.

The port can be configured for use in measuring static air pressure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. An air data probe comprising:
   a probe head, the probe head defining a longitudinal axis extending from a forward tip of the probe head to an aft end of the probe head, the probe head having a non-circular elliptical cross section orthogonal to the longitudinal axis; and
   an air data sensing port disposed in the probe head aft of the forward tip;
   wherein the air data probe further comprises a base plate configured to mount the air data probe to an exterior of an aircraft;
   wherein the probe head comprises a proximate side and a distal side with respect to the base plate, the proximate side facing the base plate, and the distal side opposite the proximate side;
   wherein the elliptical cross section comprises a major axis and a minor axis perpendicular to the major axis; and
   wherein the minor axis extends between the proximate side and the distal side.
2. The air data probe of claim 1,
   wherein a ratio of a length of the major axis to a length of the minor axis is greater than or equal to 1.1 and less than or equal to 1.7.
3. The air data probe of claim 1,
   wherein the longitudinal axis of the probe head is parallel to a plane defined by the base plate.
4. The air data probe of claim 1,
   wherein the air data sensing port is disposed on the distal side of the probe head.
5. The air data probe of claim 4, wherein the air data sensing port is a first air data sensing port, the air data probe further comprising:
   a second air data sensing port disposed on the proximate side of the probe head.
6. The air data probe of claim 4,
   wherein the air data sensing port is disposed along the minor axis of the elliptical cross section.
7. The air data probe of claim 1,
   wherein the air data probe further comprises a strut extending between the base plate and the probe head, an aft end of the strut adjacent the aft end of the probe head.
8. The air data probe of claim 1,
   wherein the air data sensing port is configured for use in measuring static air pressure.
9. A probe comprising:
   a probe head, the probe head defining a longitudinal axis extending from a forward tip of the probe head to an aft end of the probe head, the probe head having a non-circular elliptical cross section orthogonal to the longitudinal axis; and
   a port disposed in the probe head aft of the forward tip;
   wherein a length of a major axis of the elliptical cross section and a length of a minor axis of the elliptical cross section are configured to cause boundary layer separation of airflow across the probe head at a flow separation region that is aft of the port;

wherein the probe further comprises a base plate configured to mount the probe to an exterior of an aircraft;

wherein the probe head comprises a proximate side and a distal side with respect to the base plate, the proximate side facing the base plate, and the distal side opposite the proximate side; and wherein the minor axis of the elliptical cross section extends between the proximate side and the distal side.

10. The probe of claim 9,
wherein a ratio of the length of the major axis to the length of the minor axis is greater than or equal to 1.1 and less than or equal to 1.7.

11. The probe of claim 9,
wherein for positive angles of attack of the airflow across the probe head, the flow separation region is aft and above the port.

12. The probe of claim 9,
wherein for negative angles of attack of the airflow across the probe head, the flow separation region is aft and below the port.

13. The probe of claim 9,
wherein the length of the major axis and the length of the minor axis of the elliptical cross section are configured to cause the boundary layer separation of the airflow across the probe head at the flow separation region that is aft of the port for all flight conditions included within a defined flight envelope of an aircraft.

14. The probe of claim 13,
wherein the length of the major axis and the length of the minor axis of the elliptical cross section are configured to cause the boundary layer separation of the airflow across the probe head at the flow separation region for angles of attack ranging between negative twenty degrees and positive twenty degrees.

15. The probe of claim 13,
wherein the length of the major axis and the length of the minor axis of the elliptical cross section are configured to cause the boundary layer separation of the airflow across the probe head at the flow separation region for Reynolds numbers on the order of $10^6$.

16. The probe of claim 9,
wherein the longitudinal axis of the probe head is parallel to a plane defined by the base plate.

17. The probe of claim 9,
wherein the port is disposed along the minor axis of the elliptical cross section.

18. The probe of claim 9,
wherein the port is configured for use in measuring static air pressure.

* * * * *